Figures 1, 2:
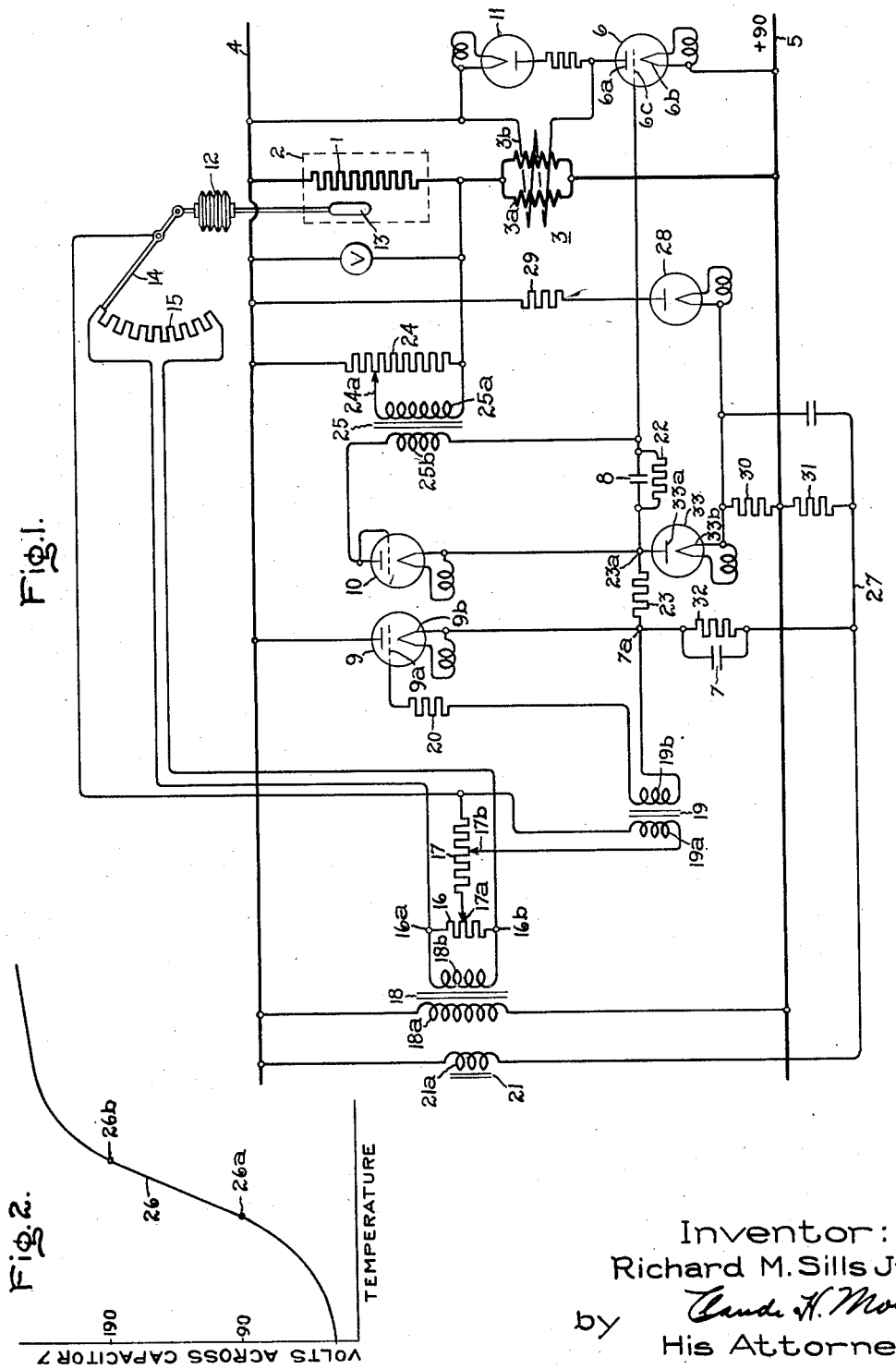

Inventor:
Richard M. Sills Jr.,
by Claude H. Mott.
His Attorney.

Patented May 22, 1951

2,554,218

UNITED STATES PATENT OFFICE 2,554,218

TEMPERATURE CONTROL SYSTEM

Richard M. Sills, Jr., Schenectady, N. Y., assignor to General Electric Company, a corporation of New York Application March 27, 1948, Serial No. 17,497

3 Claims. (Cl. 323—22)

This invention relates to control systems, more particularly to temperature control systems such as used in the control of electric heating devices, furnaces and the like, and it has for an object the provision of a simple, reliable and improved system of this character.

In carrying the invention into effect in one form thereof, a saturable reactor is provided for controlling the current input to the heating element. An electric valve is provided for controlling the current supplied to the saturating winding of the reactor. In circuit between the grid and cathode of this valve is connected a capacitor. A biasing resistor is connected between the cathode and the capacitor, and a second resistor is connected between the capacitor and the grid. A second electric valve serves to charge the capacitor. In order that the non-linear portions of the characteristic of the second valve shall not be effective in controlling the operation of the system, a third electric valve is provided for supplying current to the biasing resistor to bias the first valve beyond cut-off by an amount in excess of the voltage across the capacitor when the second valve is operating in the non-linear portion of its characteristic near cut-off. A fourth valve cooperates with the second resistor to limit the voltage of the grid of the first valve when the second valve is operating in the non-linear portion of the characteristic near saturation.

For a better and more complete understanding of the invention, reference should now be had to the following specification and to the accompanying drawing of which Fig. 1 is a simple diagrammatical sketch of an embodiment of the invention, and Fig. 2 is a characteristic curve which serves to facilitate an understanding of the operation of the invention.

Referring now to the drawing, the heating resistor 1 of an electric furnace 2 is connected in series with the reactance winding 3a of a saturable core reactor 3 across a suitable source of alternating voltage which is represented by the supply conductors 4 and 5. The reactor may be saturated to a desired degree within the range of saturation of its core by varying the amount of direct current supplied to its saturating winding 3b. Variation of the saturation of the reactor varies the reactive voltage drop across the reactance winding and also the energy input to the heating resistor 1. In operation, the impedance of the saturable reactor is high when the saturating current is low and the impedance is low when the saturating current is high. Hence increasing the saturating current increases the power applied to the heating resistor.

Direct current is supplied to the saturating winding 3b by suitable electric valve means such as the thyratron 6 which is provided with an anode 6a, a cathode 6b and a control grid 6c. The saturating control winding 3b of the reactor is connected between the anode 6a and the supply conductor 4 of the A.-C. source and the cathode 6b is connected to the opposite supply conductor 5. The conductivity of the thyratron is controlled by means of capacitors 7 and 8 and the two electric valves 9 and 10, as described in U. S. Patent 1,904,485—Livingston, dated April 18, 1933. A suitable half wave rectifying electric valve 11 is connected in parallel with the saturating winding 3b. It conducts during the inverse half cycles in which the thyratron 6 is nonconducting so as to maintain the current in the saturating winding substantially unchanged during such inverse half cycles. Conduction in the valve 11 is produced by the inductive voltage across the saturating winding when the thyratron ceases to conduct at the end of each positive half cycle of its anode voltage.

A suitable temperature responsive device which is responsive to the temperature of the furnace 2 is provided for controlling the electric valve 9. This temperature responsive device is illustrated as an expansion bellows connected through a tube to a bulb 13 in the furnace. The bulb and tube and bellows are filled with a gas or liquid whose volume changes in response to change in temperature. The bellows is thus caused to operate a contact arm 14 over a potentiometer resistor 15 so as to vary the ratio of the two portions of the resistor on opposite sides of the contact arm 14.

These two portions of the resistor on opposite sides of the contact arm constitute two arms of a Wheatstone bridge. The portions of resistor 16 on opposite sides of the slider 17a constitute the remaining two arms of this bridge. This bridge is energized from a suitable source of alternating voltage such as the source 4 and 5 to which it is connected through a transformer 18. As shown, the primary winding 18a of the transformer is connected directly to the source and the terminals of the secondary winding 18b are connected to the power input terminals 16a and 16b of the bridge.

Between the slider 17a and the contact arm 14, which constitute the output terminals of the bridge, is connected a resistor 17. When the bridge is unbalanced, a voltage appears across the resistor 17 and a portion of this voltage is supplied to the input circuit of the valve 9 to which it is connected through the transformer 19. One terminal of the primary winding 19a of the input circuit transformer is connected to one of the outside terminals of resistor 17, and the other terminal of the primary winding is connected to a slider 17b on the resistor 17. One terminal of the secondary winding 19b is connected to the cathode 9b of valve 9 and the other terminal of the secondary winding is connected through a resistor 20 to the grid 9a of valve 9. Preferably the resistor 20 has a high ohmic value, e. g. 1 megohm. By varying the position of the slider 17b, any desired portion of the voltage across the resistor 17 is selected and supplied to the input circuit of valve 9.

Movement of the contact arm 14 varies the ratio of two arms of the Wheatstone bridge and correspondingly varies the magnitude of the voltage supplied to the grid 9a of valve 9. When the voltage supplied to the grid becomes sufficiently less negative with respect to the voltage of the cathode, the valve 9 passes current substantially proportional to the grid voltage during the positive half cycle of anode voltage. This current is utilized to charge the capacitor 7 which is connected in series with valve 9 across the secondary winding 21a of a transformer 21 of which the primary winding (not shown) is connected across a suitable source of alternating voltage such as the source represented by supply conductors 4 and 5.

To facilitate an explanation of the operation, it is assumed for the moment that the voltage across capacitor 8 is zero. When the voltage of capacitor 7 reaches a predetermined value, the grid 6c of valve 6 which is connected through resistors 22 and 23 to the positive terminal of capacitor 7 becomes sufficiently less negative with respect to the voltage of cathode 6b to cause the valve 6 to become conducting. The current which flows in its anode-cathode circuit also flows through the saturating winding 3b thereby increasing the current flowing in the heating resistor 1. This results in increasing the temperature of the furnace.

Actually the voltage across the capacitor 8 is not zero. It is supplied with a feedback voltage from the heating resistor 1. To provide this feedback voltage, a potentiometer 24 is connected across the heating resistor 1 and the primary winding 25a of a transformer 25 is connected across the potentiometer. The secondary winding 25b is connected in a series circuit with rectifying valve 10 and the capacitor 8. Thus a rectified voltage proportional to the voltage across the heating resistor is supplied to the capacitor 8. The polarity of this voltage is opposite to the polarity of the voltage across capacitor 7. The potentiometer 24 is provided with a slider 24a, so that any desired portion of the voltage across the heating resistor may be supplied to the feedback circuit.

When the furnace temperature increases in response to increasing current in the heating resistor, the contact arm 14 is moved downwardly over the resistor 15 in response to expansion of the bellows 13. This changes the voltage supplied to the grid of valve 9 and effects a corresponding decrease in the current conducted by the valve. Consequently, the voltage across the capacitor 7 is correspondingly reduced and the current supplied to the heating resistor is reduced, but not to its original value. Eventually, the contact arm 14 comes to rest at a point on the resistor 15 that corresponds to the furnace temperature for which the position of the slider 17a is adjusted.

When the arm 14 comes to rest, a balanced condition of the system is present in which the heating resistor is supplying just enough heat to the furnace to maintain the temperature represented by the position of arm 14. In turn the voltage supplied to the grid of the valve 9 to produce the voltage across the capacitor 7 will be sufficiently greater than the feedback voltage across capacitor 8 to cause valve 6 to saturate reactor 3 the amount necessary to give the required temperature in the furnace.

In the operation described in the foregoing the load voltage, i. e. the voltage across the heating resistor 1, follows the voltage across the capacitor 7 fairly faithfully. The relationship between the voltage across the capacitor 7 and the position of the arm 14 on resistor 15 is illustrated graphically by the curve 26, of which the abscissa represent the position of the arm 14 and ordinates represent the voltage across the capacitor 7. The shape of this curve depends upon the characteristic of valve 9. The curve departs from linearity at the low end because the cut-off characteristic of valve 9 is not sharp. Also, it departs from linearity at the high end because saturation is not sharp. The effect of the nonlinearity of the characteristic in the operation is accentuated because the valve is operated on A.-C.

Since it is desirable that the load voltage vs. temperature characteristic be fairly linear, it is necessary to limit the effective portion of the curve 26 to its linear portion in the central part of the curve. This is accomplished in the following manner. The cathode of valve 6 is connected to a point of which the voltage is higher, i. e. more positive than the voltage of conductor 27 to which the negative terminal of the capacitor 7 is connected. For example, in one embodiment of the invention the conductor 5 was 90 volts more positive than the conductor 27, and for the purpose of illustration it may be assumed that conductor 5 is 90 volts more positive than conductor 27. A rectifying electric valve 28 is connected in series with resistors 29, 30 and 31 across the secondary winding 21a. The resistors 29, 30 and 31 are of such values that the voltage drop across resistor 31 will be equal to the desired 90 volt differential between conductors 5 and 27 and the voltage at the upper terminal of resistor 30, i. e. the voltage drop across both resistors 30 and 31 will be less than the maximum voltage drop across the resistor 32 which is connected in parallel with capacitor 7. For example, the values may be so chosen that the voltage drop across resistor 30 is 100 volts. Thus, whenever the voltage across capacitor 7 is less than 90 volts, valve 6 does not conduct. Consequently the lower portion of the curve 26 is ineffective, i. e. the system does not operate in that portion of the characteristic.

For the purpose of providing the desired maximum cut-off, a rectifying electric valve 33 is connected between the upper terminal of resistor 30 and the junction point of resistors 22 and 23. The resistor 23 cooperates with the valve 33 in effecting the maximum cut-off.

Neglecting the feedback voltage across capacitor 8, the right-hand terminal 23a of resistor 23 is effectively connected to the grid 6c of valve 6. The voltage of the point 23a is the same as the voltage of the point 7a if the voltage across capacitor 7 is less than 190 volts. However, as the charge on capacitor 7 increases and the voltage of the points 7a and 23a attain and begin to exceed the value of 190 volts, the voltage of the anode 33a of valve 33 becomes more positive than its cathode 33b and the valve 33 begins to conduct. The higher the voltage of point 7a becomes, the greater is the current which is conducted through the resistor 23 and valve 33. Consequently the voltage of point 23a does not exceed 190 volts even though the voltage at the point 7a should exceed 190 volts by a substantial amount. In other words, the upper portion of the characteristic curve 26 is ineffective in the operation of the system, i. e. the operation of the system is limited to the linear portion of the characteristic between the points 26a and 26b.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system for controlling the flow of current through an electric valve comprising a first electric valve provided with an anode, a cathode and a control grid, a capacitor connected in the cathode to grid circuit of said valve, a biasing resistor connected in circuit between said cathode and said capacitor, a second resistor connected in circuit between said capacitor and said grid, means for charging said capacitor comprising a second electric valve having a control grid and an output circuit including said capacitor, a third electric valve for supplying current to said biasing resistor to bias the grid of said first valve negative beyond cut-off by an amount greater than the voltage across said capacitor when said second valve is operating in the non-linear portion of its characteristic in the region of cut-off, and means for limiting the voltage supplied to the grid of said first valve to a predetermined value when said second valve is operating in the non-linear portion of its characteristic in the region of saturation comprising a fourth electric valve having an anode connected to the terminal of said second resistor nearest the grid of said first valve, a cathode, and a resistor having one terminal connected to the cathode of said third and fourth valves and its other terminal connected to the cathode of said first valve.

2. A control system for controlling the flow of current through a thyratron tube comprising a thyratron as a first electric valve provided with an anode, a cathode and a control grid, first and second capacitors connected in series in the cathode to grid circuit of said valve, a biasing resistor connected in said circuit between said cathode and said first capacitor, a second resistor connected in circuit between said capacitors, means for charging said first capacitor comprising a second electric valve having a control grid and an output circuit including said first capacitor, means responsive to the current flowing through said first electric valve for controlling the voltage supplied to the grid of said second valve, a third electric valve for supplying current to said biasing resistor to bias the grid of said first valve beyond cut-off by an amount greater than the voltage across said first capacitor when said second valve is operating in the nonlinear portion of its characteristic in the cut-off region, means responsive to the current flowing through said first electric valve for charging said second capacitor with a voltage opposing the voltage of said first capacitor, and means for limiting the voltage supplied to the grid of said first valve to a predetermined value when said second valve is operating in the nonlinear portion of its characteristic in the region of saturation comprising a fourth electric valve having an anode connected to the junction of said second resistor and second capacitor and a cathode, and a resistor having one terminal connected to the cathodes of said third and fourth valves and the other terminal connected to the cathode of said first valve.

3. A control system for controlling the flow of current through an electric valve comprising, a first electric valve provided with an anode, a cathode and a control grid, first and second capacitors connected in the cathode to grid circuit of said valve, first and second biasing resistors connected in series relationship and having their junction connected to the cathode of said first valve, the first of said biasing resistors being connected in the cathode to grid circuit of said first valve, a third resistor connected in circuit between said capacitors, means for charging said first capacitor comprising a second electric valve having a control grid and an outlet circuit including said first capacitor, means responsive to the current flowing through said first electric valve for controlling the voltage supplied to the grid of said second valve, a third electric valve for supplying current to said biasing resistors to produce a voltage across said first biasing resistor to bias said first valve beyond cutoff by an amount in excess of the voltage drop across said first capacitor when said second valve is operating in the non-linear portion of its characteristic in the region of cutoff, means responsive to the current flowing through said first electric valve for charging said second capacitor with a voltage opposite to that of said first capacitor, and means for limiting the voltage supplied to the grid of said first valve to a predetermined value during operation of said second valve in the non-linear portion of its characteristic in the region of saturation comprising a fourth electric valve having an anode connected to the junction of said second resistor and said second capacitor and a cathode connected to a point on said second biasing resistor having a voltage with respect to the cathode of said first valve approximately equal to said predetermined value.

RICHARD M. SILLS, Jr.

REFERENCES CITED

The following references are of record in the file of this patent:

UNITED STATES PATENTS

| Number | Name | Date |
|---|---|---|
| 1,904,485 | Livingston | Apr. 18, 1933 |
| 2,266,569 | Schneider et al. | Dec. 16, 1941 |
| 2,291,342 | Livingston | July 28, 1942 |